(12) United States Patent
Pawar et al.

(10) Patent No.: US 10,594,390 B1
(45) Date of Patent: Mar. 17, 2020

(54) PREFERENTIAL BEAMFORMING FOR RELAY WIRELESS DEVICES

(71) Applicant: Sprint Spectrum LP, Overland Park, KS (US)

(72) Inventors: Hemanth Pawar, Brambleton, VA (US); Shilpa Kowdley, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 76 days.

(21) Appl. No.: 15/662,395

(22) Filed: Jul. 28, 2017

(51) Int. Cl.
*H04B 7/26* (2006.01)
*H04B 7/06* (2006.01)
*H04W 88/04* (2009.01)

(52) U.S. Cl.
CPC ......... *H04B 7/2612* (2013.01); *H04B 7/0617* (2013.01); *H04W 88/04* (2013.01)

(58) Field of Classification Search
USPC ........................................................ 375/299
See application file for complete search history.

(56) References Cited

U.S. PATENT DOCUMENTS

| | | | | |
|---|---|---|---|---|
| 9,191,875 B1 * | 11/2015 | Kazeminejad | ...... | H04W 52/245 |
| 9,246,782 B1 * | 1/2016 | Vivanco | .............. | H04W 52/262 |
| 2002/0077151 A1 * | 6/2002 | Matthews | ........... | H04W 52/343 |
| | | | | 455/561 |
| 2011/0002371 A1 * | 1/2011 | Forenza | ............... | H04B 7/0417 |
| | | | | 375/227 |
| 2013/0142136 A1 | 6/2013 | Pi et al. | | |

* cited by examiner

Primary Examiner — Wednel Cadeau

(57) ABSTRACT

Systems, methods, and processing nodes for selecting a relay wireless device for beamforming with a beamforming-capable access node. In certain instances, the relay wireless device may be prioritized over end-user wireless devices for beamform activation, particularly when there are more wireless devices meeting the beamforming criteria of a donor access node than available beamform seats.

18 Claims, 10 Drawing Sheets

PREFERENTIAL BEAMFORMING FOR RELAY WIRELESS DEVICES

TECHNICAL BACKGROUND

As wireless networks evolve and grow, there are ongoing challenges in providing high-quality service to increasing numbers of wireless devices in various coverage areas of a wireless network. For example, one approach to improving service quality is to utilize access nodes that support beamforming. Beamforming is a transmission mode that is used to provide better coverage to wireless devices in specific locations within a coverage area of a cell or access node. A beamforming downlink transmission mode uses multiple antennae to direct or "steer" signals from the antennae towards a particular wireless device located at, for instance, a cell edge.

Another approach to improving service quality and coverage is to designate a wireless device as a relay for communications between a base station or donor access node, and an end-user wireless device. Wireless devices designated as relays (henceforth, "relay wireless devices") may be used at the edge of a coverage area of a donor access node to improve coverage and/or service, as well as in crowded areas having a high number of other wireless devices to increase the available throughput to the end-user wireless devices being relayed. In fact, relay wireless devices may be used in connection with beamforming in order to further improve the quality of service provided to wireless devices.

However, both end-user wireless devices and relay wireless devices may be suitable candidates for beamforming activation. Donor access nodes may only support a restricted number of "beamformed" wireless devices (due to processor capability, limits imposed by original equipment manufacturers, etc.), and in some instances, the number of end-user wireless devices and relay wireless devices meeting traditional beamforming criteria may exceed the beamforming capacity of a donor access node. When both end-user wireless devices and relay wireless devices meet beamforming criteria, they may compete for open beamforming seats associated with a particular donor access node.

Thus, there are ongoing challenges in providing high-quality service to end-user wireless devices when utilizing both relay wireless devices and a beamformed signal.

OVERVIEW

Exemplary embodiments described herein include systems and methods for selecting relay wireless devices for beamforming, and prioritizing the relay wireless devices for beamforming over end-user wireless devices or other relay wireless devices. An exemplary method for selecting at least one relay wireless device for beamforming includes identifying a first relay wireless device from one or more wireless devices attached to a first access node, and instructing the access node to transmit a beamformed signal to the relay wireless device.

Further exemplary embodiments relate to a system for selecting a relay wireless device attached to a relay access node. The system may include a processing node, and a processor coupled to the processing node, the processor for configuring the processing node to perform operations including identifying a first relay wireless device and at least one end-user wireless device attached to a first beamform-capable access node, and instructing the first beamform-capable access node to transmit a beamformed signal to the first relay wireless device such that the relay wireless device is prioritized over the at least one end-user wireless device. The at least one end-user wireless device may be determined to meet a beamforming criteria.

Exemplary embodiments may also include a processing node for selecting a relay wireless device for beamforming activation. The processing node may be configured to perform operations including determining first and second beamform-capable access nodes located within a radio range of a plurality of wireless devices meeting a beamforming criteria, the plurality of wireless devices comprising one or more relay wireless devices and one or more end-user wireless devices, determining that the first beamform-capable access node has reached a beamform limit, and initiating a handover of at least one of the plurality of wireless devices to the second beamform-capable access node, the second beamform-capable access node having a capacity to support beamforming.

DETAILED DESCRIPTION

Figure 1:
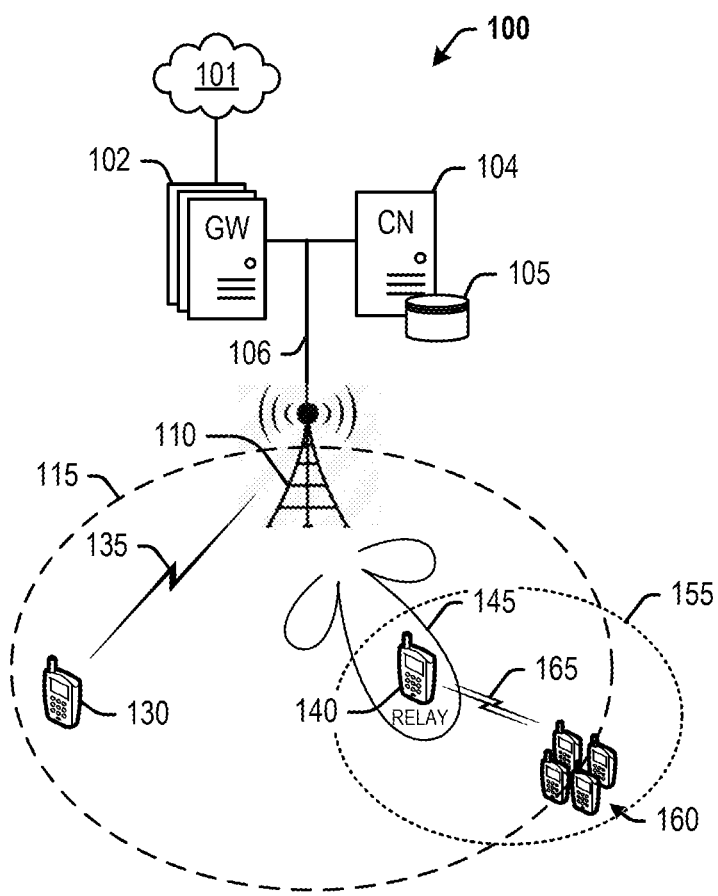
FIG. 1 depicts an exemplary system for providing preferential beamforming in wireless network.

In embodiments disclosed herein, a donor access node is configured to provide access to a communication network for a first one or more wireless devices attached directly to the donor access node over a wireless air interface deployed by the donor access node. The donor access node is further configured to provide access to the communication network for a second one or more wireless devices attached to a relay access node. The relay access node is communicably coupled to the donor access node via a wireless backhaul link on the wireless air interface. For example, the relay access node can comprise a relay wireless device configured to communicate with the donor access node over the wireless backhaul link. The relay wireless device can be configured to deploy a second wireless air interface enabling the second one or more wireless devices to attach to the relay wireless device. Alternatively or in addition, the relay wireless device may be communicatively coupled to a small-cell access node, which deploys the second wireless air interface, while the relay wireless device communicates with the donor access node via a wireless backhaul communication link.

The donor access node may further be configured to have a beamforming capability. For example, the donor access node is configured to have multiple antennae to control the direction of a wavefront by appropriately weighting the magnitude and phase of individual antenna signals. For example, in a beamforming downlink transmission mode, the antennae may direct or "steer" signals from the antennae towards a particular wireless device located at, for instance, a cell edge. This may enable the provision of better coverage to wireless devices in specific areas along the edges of cells. Each antenna in the given antenna configuration may contribute to the "steered" signal, which may achieve an array or beamforming gain. Thus, in embodiments described herein, a beamform-capable donor access node is configured or instructed to direct a beamformed signal towards a relay wireless device that is prioritized over other wireless devices attached to the donor access node. The other wireless devices may include an end-user wireless device that meets a beamforming criteria. The beamforming criteria comprises one or more of a distance of the at least one end-user wireless device from the first beamform-capable access node, a proximity of the at least one end-user wireless device to a cell edge of a coverage area of the first beamform-capable access node, a downlink signal indicator of a downlink signal received at the at least one end-user wireless device meeting a first threshold, or an uplink signal indicator of an uplink signal transmitted from the at least one end-user wireless device meeting a second threshold. The downlink signal indicator and uplink signal indicator comprise a received signal level of the downlink signal and the uplink signal, respectively. The downlink signal indicator and uplink signal indicator comprise a signal to noise ratio of the downlink signal and the uplink signal, respectively. In either case, regardless of how many end-user wireless devices qualify for beamforming activation, a relay wireless device is preferred for beamforming, such that a limited number of antennae coupled to the donor access node are configured to direct the formed beam to the relay wireless device versus any other wireless device.

In further embodiments, a second relay wireless device may be identified as being attached to the donor access node. It may be determined that the donor access node does not have the capacity to support beamforming for the second relay wireless device. Determining that the donor access node does not have the capacity to support beamforming may be based on determining that the donor access node has reached a beamform limit, which may in turn be based on a number of antennae of the donor access node being utilized to transmit the beamformed signal to the first relay wireless device. Consequently, one of the first or second relay wireless devices are selected for a handover to a second access node that has the capacity to support beamforming for the selected relay wireless device. Selecting the one of the first or second relay wireless devices may include selecting one of the first or second relay wireless devices that is located closer to the second access node. For example, the second access node may be able to provide a stronger beamformed signal to the relay wireless device that is closer to the second access node. Alternatively or in addition, selecting the one of the first or second relay wireless devices may include selecting one of the first or second relay wireless devices that requires fewer air interface resources. For example, one of the two relay wireless devices may require fewer air interface resources based on resource requirements of end-user wireless devices attached thereto. In an exemplary embodiment, the relay wireless devices may be ranked based on a number of end-user wireless devices connected to each relay wireless device, and the relay wireless device with the greatest number of end-users connected thereto may be assigned the highest priority, and the relay wireless device with the lowest number of end-users connected thereto may be assigned the lowest priority. Subsequently, a handover of the relay wireless device with the lowest priority may be handed over to the second access node, the second access node instructed to transmit a beamformed signal to the second relay device, and the first (i.e. donor) access node instructed to transmit a beamformed signal to the first relay wireless device having the highest priority. In some embodiments, the handover may be performed for an end-user wireless device to the second access node.

FIG. 1 depicts an exemplary system 100 for providing service to wireless devices attached to a relay access node. System 100 comprises a communication network 101, gateway nodes 102, controller node 104, access node 110, and wireless devices 130, 140, and 160. Access node 110 can be a standard macrocell access node, such as a base transceiver station, a radio base station, an eNodeB device, or an enhanced eNodeB device. In an exemplary embodiment, a macrocell access node can have a coverage area 115 in the range of approximately 5 km-35 km and an output power in the tens of watts. Access node 110 is configured to provide network access to at least one end-user wireless device 130 that is within coverage area 115 and is attached directly to access node 110 over a wireless air interface deployed by access node 110. For instance, end-user wireless device 130 may communicate with access node 110 via a radio bearer 135 deployed on an air interface of access node 110.

Further, wireless device 140 may be configured as a relay access node for relaying network services between access node 110 and one or more of wireless device 160. Relay wireless device 140 may comprise a customer premise equipment (CPE), which can be any stationary LTE wireless device having a stronger computational & RF capability versus standard wireless devices, as well as a directional antenna and a dedicated power supply. Further, relay wireless device 140 may be communicatively coupled to a small-cell access node (not shown herein) that may include any short range, low power, small-cell access node such as a microcell access node, a picocell access node, a femtocell access node, or a home eNodeB device. Thus, in embodiments described herein, relay wireless device 140 (in combination with a small-cell access node coupled thereto) can be configured to deploys another wireless air interface having coverage area 155, enabling wireless devices 160 that are located at or just outside a cell edge of coverage area 115 to attach thereto via, for instance, radio bearers 165. The wireless air interface deployed by relay 140 can utilize a different frequency sub-band than that deployed by access node 110, thereby minimizing potential interference, and providing a stronger signal for access by wireless devices 160. Further, relay wireless device 140 may be communicatively coupled to access node 110 via a radio bearer hereinafter referred to as a "wireless backhaul link". Consequently, access node 110 may be termed a "donor" access node.

As described herein, donor access node 110 is further configured to have a beamforming capability, and to direct a beamformed signal comprising formed beam 145 towards relay wireless device 140 preferentially, versus other end-user wireless devices 130 or 160. For example, end-user wireless device 130 may meet a beamforming criteria. The beamforming criteria may include, for example, a proximity to a cell edge of coverage area 115, congestion in the air interface in the vicinity of end-user wireless device 130, a low signal level of uplink or downlink signals transmitted on bearer 135, or any other criteria that result in a determination to transmit a formed beam to end-user wireless device 130. However, in certain instances, there may be a limit regarding the number of wireless devices that donor access node 110 may support for beamforming. Thus, it may be advantageous to prioritize relay wireless device 140 for beamforming over end-user wireless device 130, particularly when a number of antennae available for beamforming seats is limited. In other words, regardless of the fact that end-user wireless device 130 qualifies for beamforming activation using traditional criteria while relay wireless device 140 may not qualify (under the same criteria), relay wireless device 140 is preferred for beamforming, such that the limited number of antennae coupled to donor access node 110 are configured to direct formed beam 145 to relay wireless device 140 versus end-user wireless device 130.

In an embodiment, relay wireless device 140 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted by relay wireless device 140 to one or more of wireless devices 160. Likewise, RF signals received from wireless devices 160 are amplified and transmitted by relay wireless device 140 to donor access node 110. Alternatively or in addition, a layer 2 relay device performs a decode and forward (DF) function. RF signals received from donor access node 110 are demodulated and decoded, then encoded and modulated again before being transmitted by relay wireless device 140 to one or more of wireless devices 160. Likewise, RF signals received from one or more of wireless devices 160 are demodulated and decoded, then encoded and modulated again before being transmitted by relay wireless device 140 to donor access node 110. Alternatively or in addition, a layer 3 relay device also performs a decode and forward function. However, a layer 3 relay device also performs additional processing (such as ciphering and/or data concatenation/segmentation/reassembly) In other words, relay wireless device 140 performs demodulation and decoding of the received RF signals (either uplink or downlink), processes received data, then encodes, modulates, and transmits the data to one or more of wireless devices 160.

Access node 110 can comprise a processor and associated circuitry to execute or direct the execution of computer-readable instructions as further described herein. Access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 can receive instructions and other input at a user interface. Access node 110 communicates with gateway nodes 102 and controller node 104 via communication link 106.

Wireless devices 130, 140, 160 may be any device, system, combination of devices, or other such communication platform capable of communicating wirelessly with access node 110 using one or more frequency bands deployed by said access nodes. Wireless devices 130, 140, 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes. Other types of communication platforms are possible. In some embodiments, relay wireless device 140 includes stronger computational & radiofrequency capabilities than an average wireless device, as well as a directional antenna, and dedicated power supply, so that it can sustain an over-the-air backhaul link for end-user wireless devices 160 that respectively attach thereto.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by end-user wireless devices 130, 160. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (Wi-MAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (Wi-MAX), or Long Term Evolution (LTE), or combinations thereof. Communication link 106 may include S1 communications links. Other wireless protocols can also be used. Communication link 106 can be a direct link or might include various equipment, intermediate components, systems, and networks. Communication link 106 may comprise many different signals sharing the same link Gateway nodes 102 can be any network node or plurality of network nodes that are configured to interface with other network nodes using various protocols. Gateway nodes 102 can communicate user data over system 100. Gateway nodes 102 can be standalone computing devices, computing systems, or network components, and can be accessible, for example, by a wired or wireless connection, or through an indirect connection such as through a computer network or communication network. For example, gateway nodes 102 can include a serving gateway (S-GW) and/or a public data network gateway (P-GW), etc. Gateway nodes 102 can include a relay S-GW/P-GW combination for providing gateway services to relay wireless device 140, as well as a UE S-GW/P-DW combination for providing gateway services to one or more of end-user wireless devices 130, 160. Persons having ordinary skill in the art would recognize that gateway nodes 102 are not limited to any specific technology architecture, such as Long Term Evolution (LTE), and can be used with any network architecture and/or protocol.

Each of gateway nodes 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to access node 110 and wireless devices 130, 140, 160, such as an ability to activate beamforming, a location of wireless devices 130, 140, 160, beamforming criteria associated therewith, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
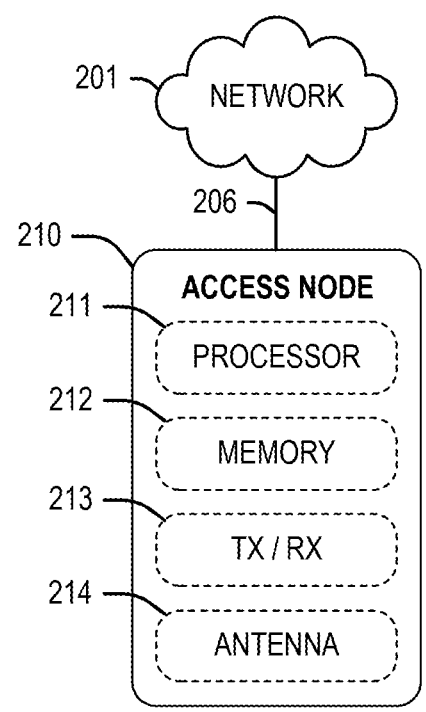
FIG. 2 depicts an exemplary donor access node for providing service to wireless devices attached to a relay access node.

FIG. 2 depicts an exemplary donor access node 210. As described herein, donor access node 210 provides access to network services from network 201 to wireless devices attached thereto, either directly, or relayed via a relay wireless device or a combination of a relay wireless device and a small-cell access node (as further described herein with reference to FIGS. 3-4). In this embodiment, donor access node 210 is illustrated as being in communication with network 201 via communication link 206, and comprising a processor 211, a memory 212, a transceiver 213, and an antenna 214. Communication link 206 may be any interface that enables communication between donor access node 210 and network 201, such as an S1 or S4/S5 interface. Other network nodes such as gateways and controllers may be present but are not shown for purposes of simplicity. Processor 211 executes operations based on instructions provided in memory 212. Transceiver 213 and antenna 214 enable wireless communication with one or more wireless devices as described herein. Memory 212 may be any memory or other logical unit that comprises instructions for performing operations further described herein. For example, memory 212 includes a scheduling module for scheduling wireless resources on an air-interface deployed by combination of transceiver 213 and antenna 214. The scheduling module may comprise instructions for selecting a relay wireless device for beamforming and/or prioritizing a relay wireless device over other wireless devices for beamforming, as further described herein.

Figure 3:
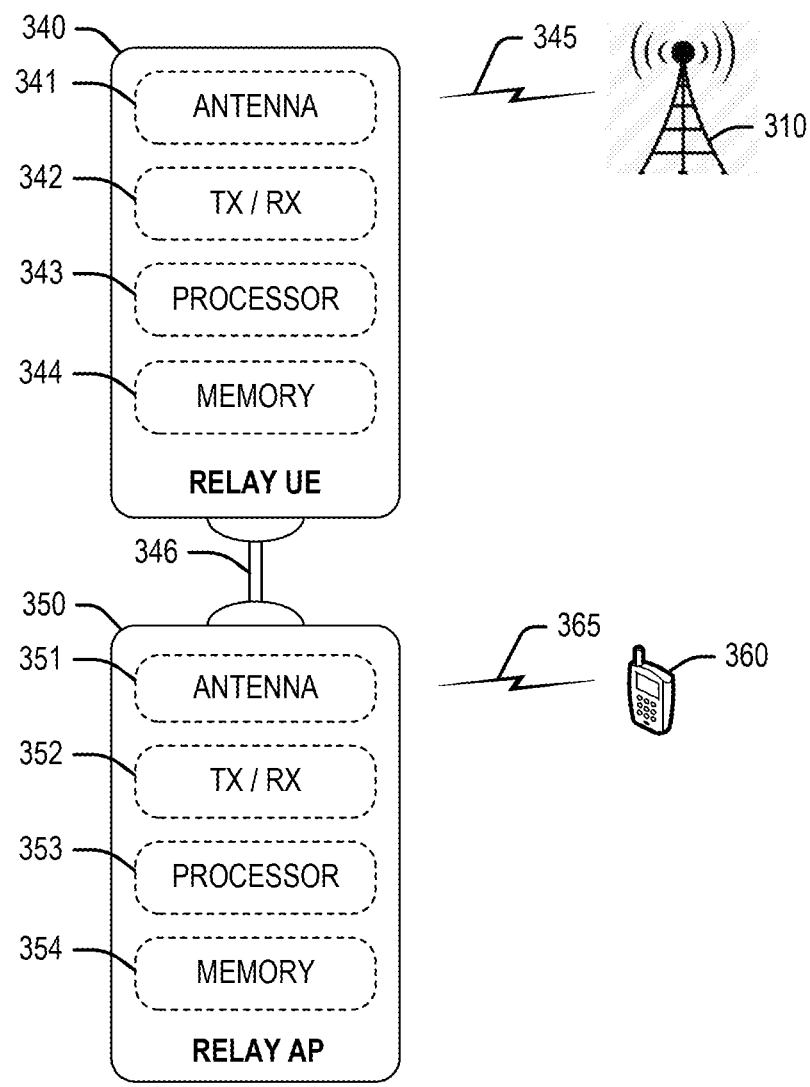
FIG. 3 depicts an exemplary relay access node comprising a relay wireless device coupled to a small-cell access node.

FIG. 3 depicts an exemplary relay access node comprising a relay wireless device 340 coupled to a small-cell access node 350. Relay wireless device 340 is illustrated as comprising an antenna 341 for direct (i.e. unrelayed) communication with donor access node 310 via wireless backhaul link 345, a transceiver 342, a processor 343, and a memory 344 for storing instructions that enable relay wireless device 340 to perform operations described herein. In some embodiments, relay wireless device 340 is referred to as a customer premise equipment (CPE), which includes any stationary LTE wireless device having a stronger computational & RF capability versus standard wireless devices, as well as a directional antenna and a dedicated power supply, enabling relay wireless device 340 to efficiently provide resources to end-user wireless devices, such as end-user wireless device 360, via small-cell access node 350. Consequently, small-cell access node 350 may be co-located with relay wireless device 340, and may be connected to relay wireless device 340 via a communication interface 346. Communication interface 346 may be any interface that enables direct communication between relay wireless device 340 and small-cell access node 350, such as USB, FireWire, Ethernet, or any other serial, parallel, analog, or digital interface.

Small-cell access node 350 is illustrated as comprising an antenna 351, a transceiver 352, a processor 353, and a memory 354 for storing instructions that are executed by processor 353. Memory 354 may be any memory or other logical unit that comprises instructions for performing operations such as relaying data from donor access node 310 to end-user wireless device 360 over air interface 365. In some embodiments, small-cell access node 350 may be a home eNodeB. Moreover, although only one transceiver is depicted in each of relay wireless device 340 and small-cell access node 350, additional transceivers may be incorporated in order to facilitate communication across interface 346 and other network elements.

Relay wireless device 340 may begin to function as a relay wireless device by sending a message to donor access node 310 to indicate to donor access node 310 that wireless device 340 is functioning as a relay wireless device. In some embodiments, relay wireless device 340 can request to send a buffer status report to donor access node 310. Donor access node 310 can grant this request in a conventional manner. Relay wireless device 340 may respond to the grant by sending a short buffer status report. This short buffer status report is associated with a logical channel group that indicates the buffer status report is communicating the status of relay wireless device 340 as a relay, and thus is not asking for additional resource allocations (like a 'conventional' buffer status report would indicate). In other words, when relay wireless device 340 responds with a buffer status report for the 'special' logical channel group, it means that the buffer status report is not actually reporting the status of a buffer. Rather, this buffer status report indicates that the wireless device is now functioning as a relay. Once status of relay wireless device 340 is established, relay wireless device 340 may instruct small-cell access node 350 to start accepting connection requests from one or more end-user wireless devices such as wireless device 360.

Further, based on the indication of relay status, donor access node 310 may alter how relay wireless device 340 is treated. For example, as described herein, relay wireless device 340 may be provided with preferential treatment for beamforming, because it is functioning as a relay, versus other wireless devices, regardless of whether or not they meet traditional beamforming criteria. In other words, whereas traditionally certain wireless devices that are on a cell edge are selected for beamforming activation (since their received signal level may be poor, and beamforming gains may be the greatest by serving such wireless devices), relay wireless device 340 may be preferentially selected for beamforming solely based on its indication of a relay status.

Figure 4:
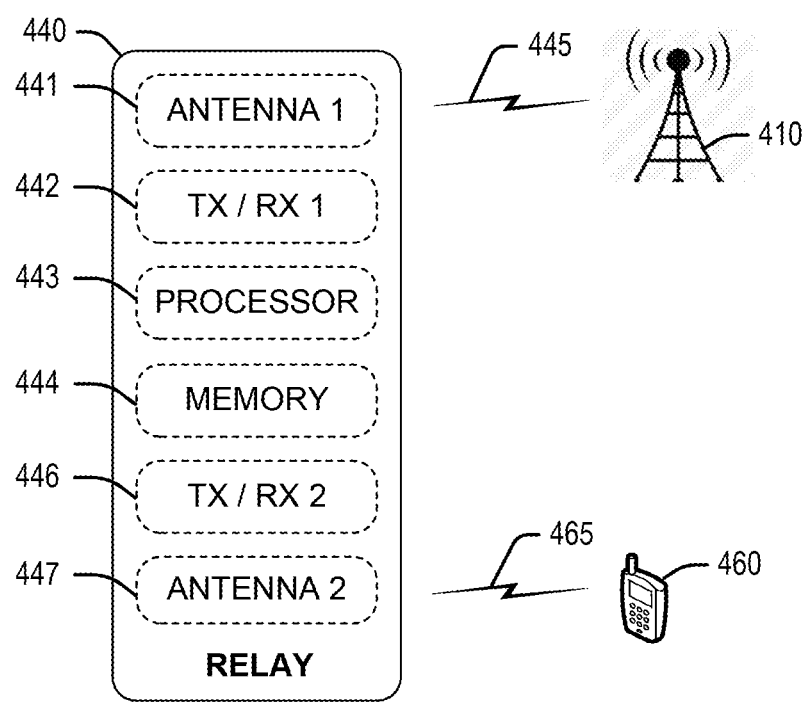
FIG. 4 depicts an exemplary relay wireless device integrated with a small-cell access node.

In some embodiments, a relay wireless device may integrate components a small-cell access node into a single unit, as described in FIG. 4. In this embodiment, relay wireless device 440 is illustrated as comprising a first antenna 441 for direct (i.e. unrelayed) communication with donor access node 410 via wireless backhaul link 445, a first transceiver 442, a processor 443, and a memory 444 for storing instructions that enable relay wireless device 440 to perform operations described herein. In some embodiments, relay wireless device 440 is referred to as a customer premise equipment (CPE), which includes any stationary LTE wireless device having a stronger computational & RF capability versus standard wireless devices, as well as a directional antenna and a dedicated power supply, enabling relay wireless device 440 to efficiently provide resources to end-user wireless devices, such as end-user wireless device 460. Consequently, relay wireless device 440 includes a second transceiver 446 and a second antenna 447 that work in conjunction to deploy a wireless air interface 465, enabling end-user wireless device 460 to attach thereto. Consequently, memory 444 is further configured to relay data between access node 410 and end-user wireless device 460 via air interface 465. Moreover, although only one transceiver is depicted in relay wireless device 440, additional transceivers may be incorporated therein.

Relay wireless device 440 may begin to function as a relay wireless device by sending a message to donor access node 410 to indicate to donor access node 410 that wireless device 440 is functioning as a relay wireless device. In some embodiments, relay wireless device 440 can request to send a buffer status report to donor access node 410. Donor access node 410 can grant this request in a conventional manner. Relay wireless device 440 may respond to the grant by sending a short buffer status report. This short buffer status report is associated with a logical channel group that indicates the buffer status report is communicating the status of relay wireless device 440 as a relay, and thus is not asking for additional resource allocations (like a 'conventional' buffer status report would indicate). In other words, when relay wireless device 440 responds with a buffer status report for the 'special' logical channel group, it means that the buffer status report is not actually reporting the status of a buffer. Rather, this buffer status report indicates that the wireless device is now functioning as a relay. Once status of relay wireless device 440 is established, relay wireless device 440 may start accepting connection requests from one or more end-user wireless devices such as wireless device 460.

Further, based on the indication of relay status, donor access node 410 may alter how relay wireless device 440 is treated. For example, as described herein, relay wireless device 440 may be provided with preferential treatment for beamforming, because it is functioning as a relay, versus other wireless devices, regardless of whether or not they meet traditional beamforming criteria. In other words, whereas traditionally certain wireless devices that are on a cell edge are selected for beamforming activation (since their received signal level may be poor, and beamforming gains may be the greatest by serving such wireless devices), relay wireless device 440 may be preferentially selected for beamforming solely based on its indication of a relay status.

Figure 5:
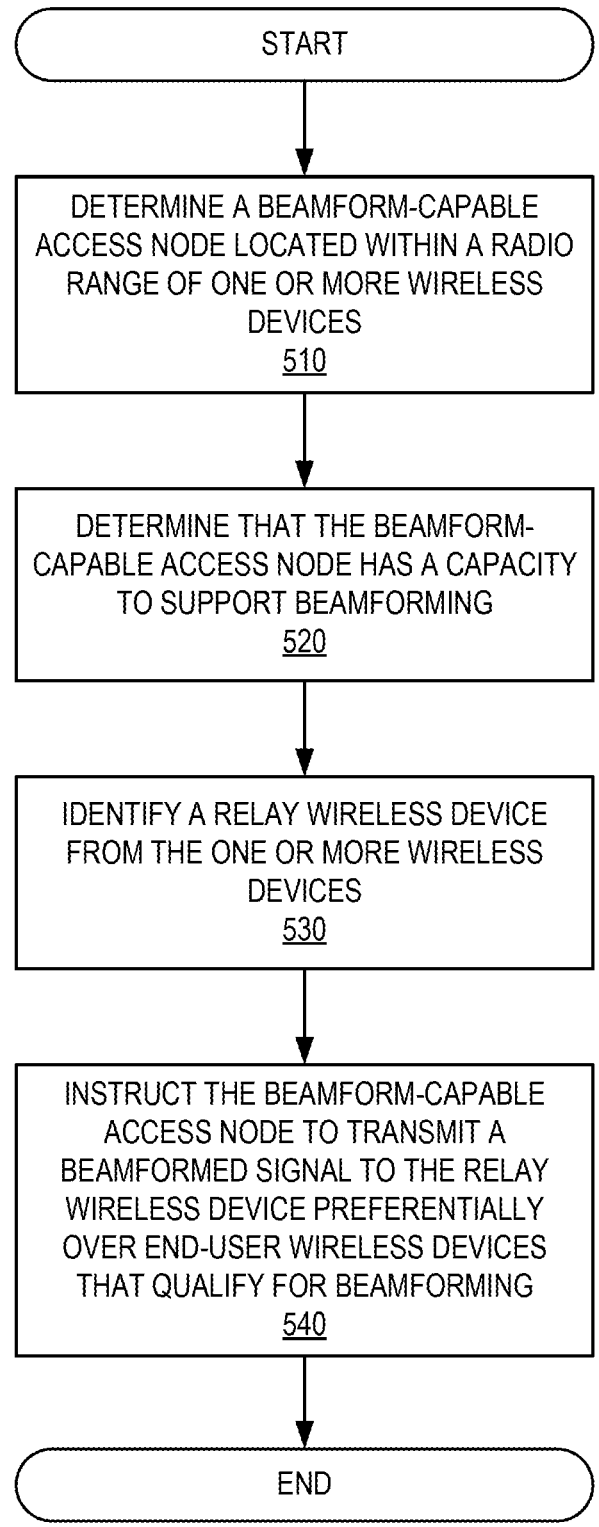
FIG. 5 depicts an exemplary method for providing preferential beamforming in wireless network.

FIG. 5 depicts an exemplary method for providing preferential beamforming in wireless network. The operations in FIG. 5 may be performed by a scheduler module of an access node, such as access node 110 described in FIG. 1. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the depicted methods can be omitted, rearranged, combined, and/or adapted in various ways.

At 510, a beamform-capable access node located within a radio range of one or more wireless devices is determined. The beamform-capable access node may be configured to provide access to a communication network for the wireless devices over a wireless air interface deployed by the beamform-capable access node, or may provide access to a communication network via a backhaul link. For example, the wireless devices may be any one of end-user wireless devices directly connected to the beamform-capable access node, relay wireless devices, or end-user wireless devices attached to a relay wireless device.

At 520, it is determined that the beamform-capable access node has a capacity to support beamforming. For example, a beamform load (e.g., a number of beamformed wireless devices) at cell sectors of the beamform-capable access node may be determined. If the beamform load at one or more cell sectors of the beamform-capable access node is less than a threshold (e.g., limited number of beamform seats), the beamform-capable access node has an open beamforming seat, and therefore has the capacity to support beamforming. Alternatively or in addition, a number of antennae of the beamform-capable access node available to form a beam may be indicative of a capacity to support beamforming. For example, if a beamform-capable access node has 4 transmit antennae, and the 4 transmit antennae are currently being utilized to form a beam to a wireless device (such as, for instance, a relay wireless device), then the beamform-capable access node may not have the capacity. Whereas, if at least 4 transmit antennae are available to form a beam, then it can be determined that the beamform-capable access node has a capacity to support beamforming.

At 530, a relay wireless device is identified from the one or more wireless devices referenced above at 510. The identified relay wireless device may be serving as a backhaul link for one or more end-user wireless devices connected to the relay wireless device (via, for instance, a small-cell access node coupled to the relay wireless device). In an exemplary embodiment, the relay wireless device is identified by an indication from the relay wireless device that it is functioning as a relay. For example, a short buffer status report may be parsed to determine that a wireless device is functioning as a relay, as described herein.

At 540, the beamform-capable access node having the capacity to support beamforming is instructed to transmit a beamformed signal to the relay wireless device. This instruction may be executed regardless of whether or not other wireless devices attached to the beamform-capable access node qualify for (or require) a formed beam, based on traditional beamforming criteria. For example, one or more end-user wireless devices may be located proximate the edge of the coverage area or are otherwise subject to poor conditions such as heavy traffic in the particular area in which the wireless device is located or a poor signal to noise interference ratio. Since there may be a limit regarding the number of wireless devices that a beamform-capable access node may support for beamforming, it may be advantageous to prioritize a relay wireless device for beamforming over an end-user wireless device, particularly when the number of beamforming seats is limited.

Figure 6:
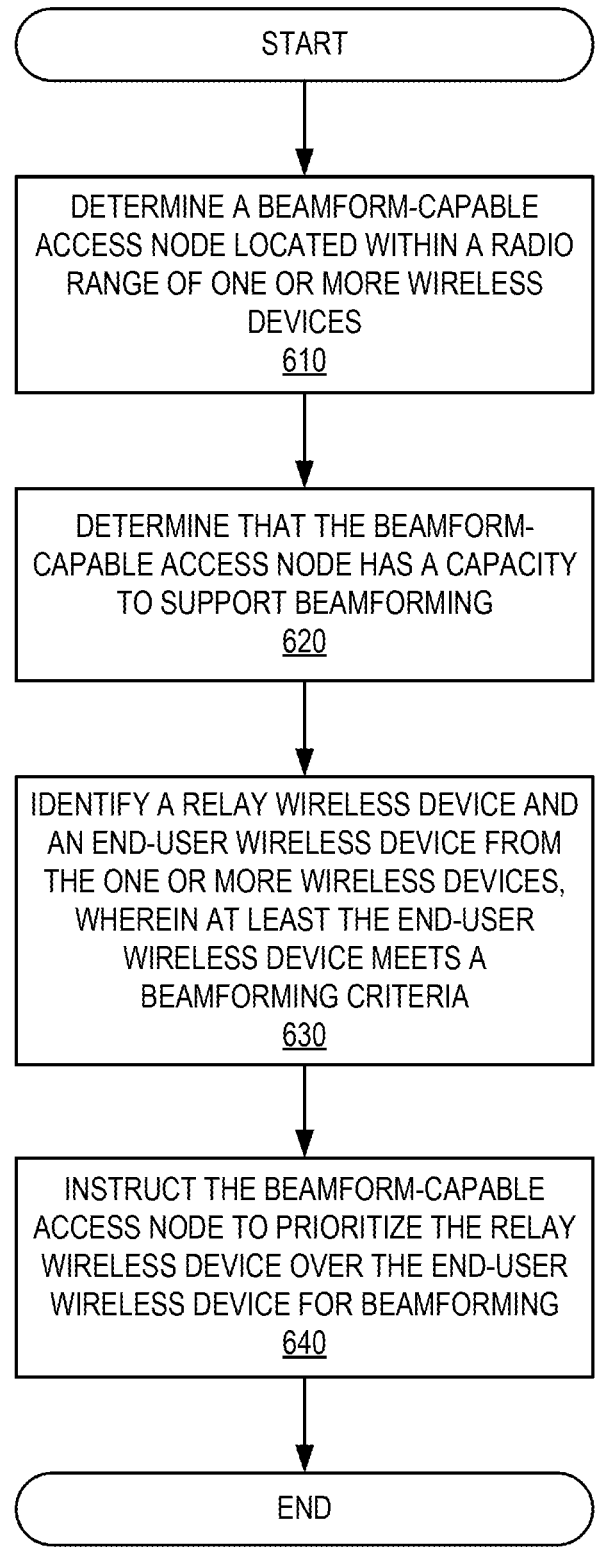
FIG. 6 depicts another exemplary method for providing preferential beamforming in wireless network.

FIG. 6 depicts another exemplary method for providing preferential beamforming in wireless network. The operations in FIG. 6 may be performed by a scheduler module of an access node, such as access node 110 described in FIG. 1. In other embodiments, the method can be implemented with any suitable network element. Although FIG. 6 depicts steps performed in a particular order for purposes of illustration and discussion, the operations discussed herein are not limited to any particular order or arrangement. One skilled in the art, using the disclosures provided herein, will appreciate that various steps of the depicted methods can be omitted, rearranged, combined, and/or adapted in various ways.

At 610, a beamform-capable access node located within a radio range of one or more wireless devices is determined. The beamform-capable access node may be configured to provide access to a communication network for the wireless devices over a wireless air interface deployed by the beamform-capable access node, or may provide access to a communication network via a backhaul link. For example, the wireless devices may be any one of end-user wireless devices directly connected to the beamform-capable access node, relay wireless devices, or end-user wireless devices attached to a relay wireless device.

At 620, it is determined that the beamform-capable access node has a capacity to support beamforming. For example, a beamform load (e.g., a number of beamformed wireless devices) at cell sectors of the beamform-capable access node may be determined. If the beamform load at one or more cell sectors of the beamform-capable access node is less than a threshold (e.g., limited number of beamform seats), the beamform-capable access node has an open beamforming seat, and therefore has the capacity to support beamforming. Alternatively or in addition, a number of antennae of the beamform-capable access node available to form a beam may be indicative of a capacity to support beamforming. For example, if a beamform-capable access node has 4 transmit antennae, and the 4 transmit antennae are currently being utilized to form a beam to a wireless device (such as, for instance, a relay wireless device), then the beamform-capable access node may not have the capacity. Whereas, if at least 4 transmit antennae are available to form a beam, then it can be determined that the beamform-capable access node has a capacity to support beamforming.

At 630, a relay wireless device and at least one directly-connected end-user wireless device is identified from the one or more wireless devices referenced above at 610. The directly-connected end-user wireless device is any wireless device that is directly connected to the access node without going through a relay wireless device. Further, the relay wireless device may be serving as a backhaul link for one or more end-user wireless devices connected to the relay wireless device (via, for instance, a small-cell access node coupled to the relay wireless device). In an exemplary embodiment, the relay wireless device is identified by an indication from the relay wireless device that it is functioning as a relay. For example, a short buffer status report may be parsed to determine that a wireless device is functioning as a relay, as described herein. Further, the directly-connected end-user wireless device may meet one or more beamforming criteria, such as being located greater than a threshold distance from the beamform-capable access node or being proximate a cell edge of a coverage area of the beamform-capable access node. Alternatively or in addition, a downlink signal indicator of a downlink signal received at the at directly-connected end-user wireless device may meet a threshold, or an uplink signal indicator of an uplink signal transmitted from the directly-connected end-user wireless device may meet a threshold. The downlink or uplink signal indicators may include a received signal level, or a signal to noise ratio.

In either case, at 640, the beamform-capable access node having the capacity to support beamforming is instructed to transmit a beamformed signal to the relay wireless device. This instruction may be executed regardless of whether or not the directly-connected end-user wireless device meets the beamforming criteria. Since there may be a limit regarding the number of wireless devices that a beamform-capable access node may support for beamforming, it may be advantageous to prioritize a relay wireless device for beamforming over an end-user wireless device, particularly when the number of beamforming seats is limited. Thus, regardless of how many end-user wireless devices qualify for beamforming activation, a relay wireless device is preferred for beamforming, such that a limited number of antennae coupled to the donor access node are configured to direct the formed beam to the relay wireless device versus any other wireless device.

Figure 7:
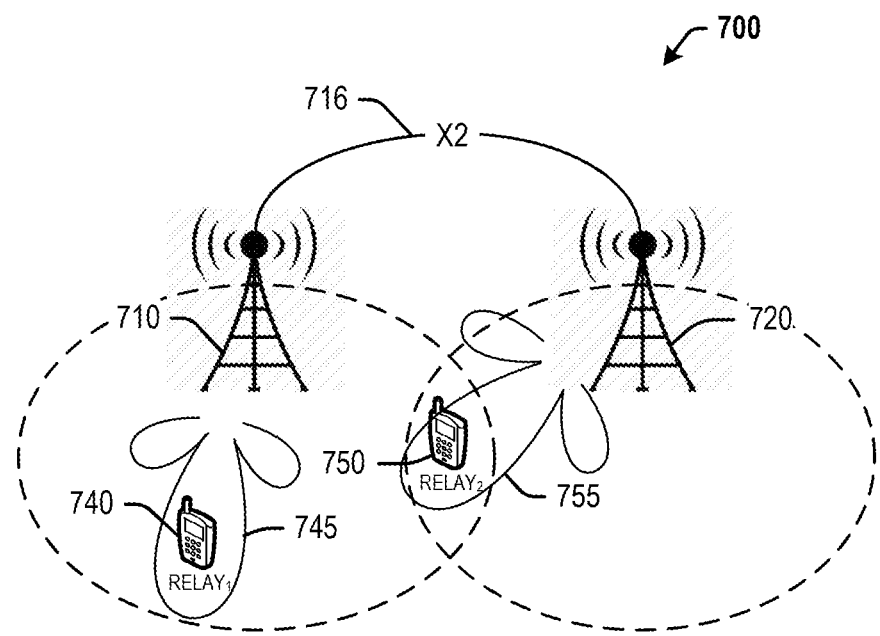
FIG. 7 depicts another exemplary system for providing preferential beamforming in wireless network.

In certain example embodiments, a plurality of relay wireless devices may be located within radio range of more than one donor access node. In these exemplary embodiments, one or more of the relay wireless devices may be prioritized over the other relay wireless devices, and the low-priority relay wireless devices handed over to another donor access node, particularly if the first donor access node has reached a beamforming limit. FIG. 7 depicts such an exemplary system 700 for providing preferential beamforming in wireless network.

System 700 comprises at least access nodes 710 and 720 in direct communication over an X2 link 716, and relay wireless devices 740 and 750. Access nodes 710, 720 may be considered analogous to access node 110 in system 100, including any standard macrocell access node, such as a base transceiver station, a radio base station, an eNodeB device, or an enhanced eNodeB device. Access nodes 710, 720 are configured to provide network access to one or more of relay wireless devices 740, 750. Wireless devices 740, 750 may be configured as relay access nodes for relaying network services between access nodes 710, 720 and one or more end-user wireless devices (not shown). For example, relay wireless devices 740, 750 may comprise a customer premise equipment (CPE), which can be any stationary LTE wireless device having a stronger computational & RF capability versus standard wireless devices, as well as a directional antenna and a dedicated power supply. Further, relay wireless devices 740, 750 may be communicatively coupled to small-cell access nodes (not shown herein) that may include any short range, low power, small-cell access node such as a microcell access node, a picocell access node, a femtocell access node, or a home eNodeB device. Consequently, access nodes 710, 720 may be termed "donor" access nodes. Not shown herein but apparent to those having ordinary skill in the art may be other network nodes, such as gateways, controller nodes, and other access nodes.

As described herein, donor access nodes 710, 720 are both configured to have a beamforming capability. Further, in certain instances, there may be a limit regarding the number of wireless devices that donor access node 710 may support for beamforming. Thus, it may be advantageous to prioritize relay wireless devices 740, 750 for beamforming. In other words, donor access node 710 may have reached its beamforming limit based on transmittal of formed beam 745 to relay wireless device 750, and determines that there is no open beamforming seat for relay wireless device 750 located within its coverage area. Consequently, relay wireless device 750 may be handed over to neighboring donor access node 720 that has an open beamforming seat.

Alternatively or in addition, relay wireless device 750 may have a lower priority (based on, for instance, a smaller resource requirement of end-user wireless devices connected thereto), and thus may be handed over to neighboring donor access node 720 in order to open a beamforming seat at donor access node 710 for higher priority relay wireless device 740 (which may have a greater resource requirement of end-user wireless devices connected thereto). In some embodiments, prioritizing relay wireless devices 740, 750 may include selecting the relay wireless device that is located closer to neighboring donor access node 720 for handover. For example, neighboring donor access node 720 may be able to provide a stronger beamformed signal 755 to relay wireless device 750 that is closer to neighboring donor access node 720. Subsequent to a handover of relay wireless device 750 to neighboring donor access node 720, neighboring donor access node 720 may be instructed to transmit beamformed signal 755 to relay wireless device 750, and donor access node 710 instructed to transmit a beamformed signal comprising formed beam 745 to relay wireless device 740. Handover instructions and other information may be communicated between donor access nodes 710, 720 over x2 link 716. Alternatively or in addition, handover requests and instructions may be transmitted to and received from a controller node or other network entity via other types of connections, such as S1, S5, S6 connections.

Figure 8:
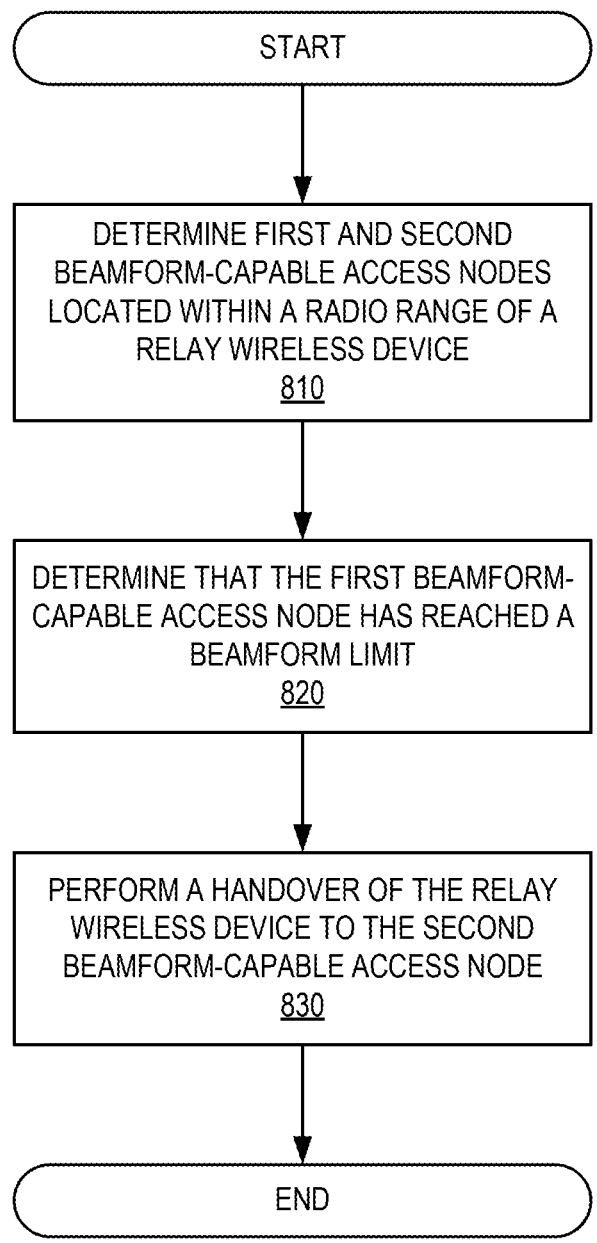
FIG. 8 depicts an exemplary method for performing a handover of a relay wireless device.

FIG. 8 depicts an exemplary method for performing a handover of a relay wireless device. The operations in FIG. 8 may be performed by a scheduler module of an access node, such as access node 110 described in FIG. 1. In other embodiments, the method can be implemented with any suitable network element. Although FIG. 8 depicts steps performed in a particular order for purposes of illustration and discussion, the operations discussed herein are not limited to any particular order or arrangement. One skilled in the art, using the disclosures provided herein, will appreciate that various steps of the depicted methods can be omitted, rearranged, combined, and/or adapted in various ways.

At 810, first and second beamform-capable access nodes are determined. The first and second beamform-capable access nodes are located within a radio range of a plurality of wireless devices meeting a beamforming criteria. The first and second beamform-capable access nodes may be similar to those described in FIG. 7, such as access nodes 710 and 720. The plurality of wireless devices comprises at least one relay wireless device, which may be similar to relay wireless device 750. Thus, it will be understood that the relay wireless device is within radio range of both first and second beamform-capable access nodes.

At 820, it is determined that one of the beamform-capable access nodes has reached a beamform limit. For purposes of simplicity, this access node is referred to as the first access node, and may be considered similar to donor access node 710. However, either access node may reach the beamform limit and trigger a handover to the other. In either case, determining that the first beamform-capable access node has reached a beamform limit may be based on a beamform load (e.g., a number of beamformed wireless devices) at cell sectors of the first beamform-capable access node. If the beamform load at one or more cell sectors of the beamform-capable access node is greater than a threshold, the beamform-capable access node may not have any open beamforming seats, and therefore does not have the capacity to support beamforming. Alternatively or in addition, a number of antennae of the beamform-capable access node available to form a beam may be indicative of a capacity to support beamforming. For example, if a beamform-capable access node has 4 transmit antennae, and the 4 transmit antennae are currently being utilized to form a beam to another wireless device (such as, for instance, a high-priority relay wireless device), then the beamform-capable access node may not have the capacity.

At 830, the relay wireless device is handed over to the second beamform-capable access node, the second beamform-capable access node having the capacity to support beamforming. For purposes of simplicity, this access node is referred to as the second access node. However, as noted above, either access node may reach the beamform limit and trigger the handover to the other access node. Subsequent a handover of the relay wireless device to the second beamform-capable access node, the second beamform-capable access node may be instructed to transmit a beamformed signal to the relay wireless device.

Figure 9:
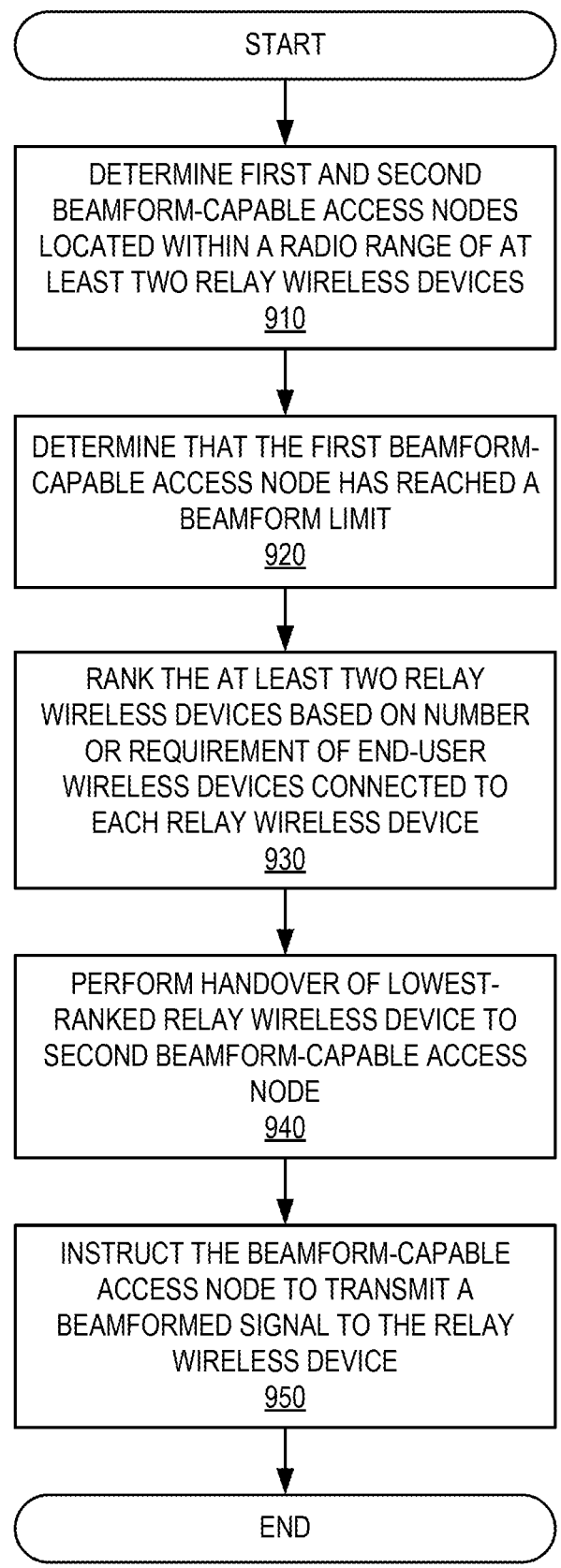
FIG. 9 depicts another exemplary method for performing a handover of a relay wireless device.

In some embodiments, the relay wireless device may be handed over the second access node based having a lower priority than other relay wireless devices attached to the first access node. FIG. 9 depicts such an exemplary method for performing a handover of a relay wireless device. The operations in FIG. 9 may be performed by a scheduler module of an access node, such as access node 110 described in FIG. 1. In other embodiments, the method can be implemented with any suitable network element. Although FIG. 9 depicts steps performed in a particular order for purposes of illustration and discussion, the operations discussed herein are not limited to any particular order or arrangement. One skilled in the art, using the disclosures provided herein, will appreciate that various steps of the depicted methods can be omitted, rearranged, combined, and/or adapted in various ways.

At 910, it is determined that a first beamform-capable access node has reached a beamform limit. The first beamform-capable access node may be similar to access node 710 described in FIG. 7. Determining that the first beamform-capable access node has reached a beamform limit may be based on a beamform load (e.g., a number of beamformed wireless devices) at cell sectors of the first beamform-capable access node. If the beamform load at one or more cell sectors of the beamform-capable access node is greater than a threshold, the beamform-capable access node may not have any open beamforming seats, and therefore does not have the capacity to support beamforming. Alternatively or in addition, a number of antennae of the beamform-capable access node available to form a beam may be indicative of a capacity to support beamforming. For example, if a beamform-capable access node has 4 transmit antennae, and the 4 transmit antennae are currently being utilized to form a beam to another wireless device (such as, for instance, a high-priority relay wireless device), then the beamform-capable access node may not have the capacity.

At 930, at least two relay wireless devices attached to the first beamform-capable access node are ranked and/or prioritized. The at least two relay wireless devices may be similar to relay wireless devices 740, 750 described in FIG. 7. For example, the priority may be based on a resource requirement or number of end-user wireless devices connected to each relay wireless device. In some embodiments, prioritizing relay wireless devices may include selecting the relay wireless device that is located closer to a second beamform-capable access node for handover, since the second beamform-capable access node may be able to provide a stronger beamformed signal to the relay wireless device that is closer thereto.

Thus, at 940, a handover is performed of the lower-ranked relay wireless device to the second beamform-capable access node. Instructions to perform the handover may be communicated between the first and second beamform-capable access nodes via a direct connection between the first and second beamform-capable access nodes, or via a network element such as a controller node. In either case, subsequent the handover, at 950 the second beamform-capable access node is be instructed to transmit a beamformed signal to the relay wireless device.

The above-described methods are not limited to relay wireless devices, but may be applied to any high-priority wireless device. For example, in an alternative embodiment, a relay wireless device is handed over to the second beamform-capable access node having capacity to support beamforming, since the first beamform-capable access node may be transmitting a formed beam to another high-priority wireless device that is not a relay wireless device. Alternatively or in addition, an end-user wireless device that requires beamforming is handed over to the second beamform-capable access node having capacity to support beamforming upon determining that the first beamform-capable access node is transmitting a formed beam to a relay wireless device. Other combinations of priority and handover may become apparent to those having ordinary skill in the art in light of this disclosure.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: donor access node 110, relay wireless device 140, gateway nodes 102, controller node 104, and/or network 101.

Figure 10:
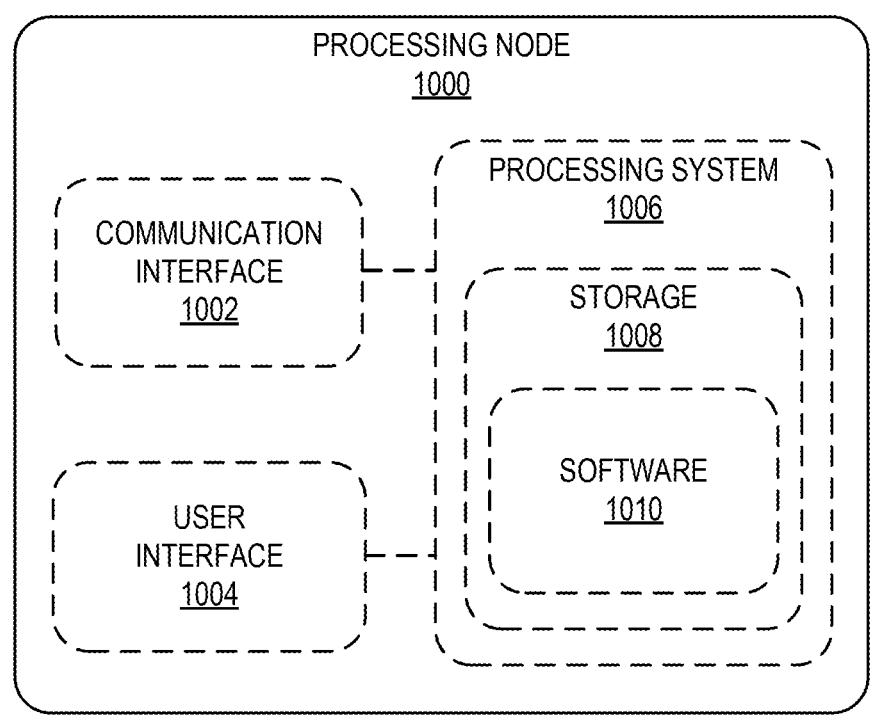
FIG. 10 depicts an exemplary processing node for providing service to wireless devices attached to a relay access node.

FIG. 10 depicts an exemplary processing node 1000 comprising communication interface 1002, user interface 1004, and processing system 1006 in communication with communication interface 1002 and user interface 1004. Processing system 1006 includes storage 1008, which can comprise a disk drive, flash drive, memory circuitry, or other memory device. Storage 1008 can store software 1010 which is used in the operation of the processing node 1000. Storage 1008 may include a disk drive, flash drive, data storage circuitry, or some other memory apparatus. Software 1010 may include computer programs, firmware, or some other form of machine-readable instructions, including an operating system, utilities, drivers, network interfaces, applications, or some other type of software. For example, software 1010 may include modules for perform the operations described herein. Processing system 1006 may include a microprocessor and other circuitry to retrieve and execute software 1010 from storage 1008. Processing node 1000 may further include other components such as a power management unit, a control interface unit, etc., which are omitted for clarity. Communication interface 1002 permits processing node 1000 to communicate with other network elements. User interface 1004 permits the configuration and control of the operation of processing node 1000.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting at least one relay wireless device for beamforming, the method comprising:
   identifying a first relay wireless device from one or more wireless devices attached to a first access node;
   identifying a first end-user wireless device attached directly to the first access node, without going through a relay wireless device;
   determining that the first end-user wireless device meets a beamforming criteria and that the relay wireless device does not meet the beamforming criteria; and
   regardless of the first end-user wireless device meeting the beamforming criteria and the relay wireless device not meeting the beamforming criteria, instructing the access node to utilize beamforming for the relay wireless device and to not utilize beamforming for the first end-user wireless device.

2. The method of claim 1, further comprising determining that the first access node has a capacity to support beamforming for the first relay wireless device.

3. The method of claim 2, wherein the beamforming criteria comprises one or more of:
   a distance of the first end-user wireless device from the first access node;
   a proximity of the first end-user wireless device to a cell edge of a coverage area of the first access node;
   a downlink signal indicator of a downlink signal received at the first end-user wireless device meeting a first threshold; or
   an uplink signal indicator of an uplink signal transmitted from the first end-user wireless device meeting a second threshold.

4. The method of claim 2, further comprising:
   identifying a second relay wireless device attached to the first access node;
   determining that the first access node does not have the capacity to support beamforming for the second relay wireless device; and
   selecting one of the first or second relay wireless devices for a handover to a second access node that has the capacity to support beamforming for the selected relay wireless device.

5. The method of claim 4, wherein selecting the one of the first or second relay wireless devices further comprises selecting one of the first or second relay wireless devices that is located closer to the second access node.

6. The method of claim 4, wherein selecting the one of the first or second relay wireless devices further comprises selecting one of the first or second relay wireless devices that requires fewer air interface resources.

7. The method of claim 6, wherein a determination of which of the first or second relay wireless devices requires fewer air interface resources is based on resource requirements of end-user wireless devices attached to each of the first and second relay wireless devices.

8. A system for selecting a relay wireless device attached to a relay access node, the system comprising:
   a processing node; and
   a processor coupled to the processing node, the processor for configuring the processing node to perform operations comprising:
   identifying a first relay wireless device attached to a first beamform-capable access node;
   identifying at least one end-user wireless device attached directly to the first beamform-capable access node without going through a relay wireless device;
   determining that the at least one end-user wireless device meets a beamforming criteria and that the first relay wireless device does not meet the beamforming criteria; and
   regardless of the at least one end-user wireless device meeting the beamforming criteria and the first relay wireless device not meeting the beamforming criteria, instructing the first beamform-capable access node to utilize beamforming for the first relay wireless device and to not utilize beamforming for the at least one end-user wireless device.

9. The system of claim 8, wherein identifying the relay wireless device comprises parsing a buffer status report transmitted by the first relay wireless device to the first beamform-capable access node.

10. The system of claim 8, wherein the beamforming criteria comprises one or more of:
    a distance of the at least one end-user wireless device from the first beamform-capable access node;
    a proximity of the at least one end-user wireless device to a cell edge of a coverage area of the first beamform-capable access node;
    a downlink signal indicator of a downlink signal received at the at least one end-user wireless device meeting a first threshold;
    or an uplink signal indicator of an uplink signal transmitted from the at least one end-user wireless device meeting a second threshold.

11. The system of claim 8, wherein the operations further comprise:
    identifying a second relay wireless device attached to the first beamform-capable access node;
    determining that the first beamform-capable access node has reached a beamform limit; and
    performing a handover of the second relay wireless device to a second beamform-capable access node that is within radio range of the second relay wireless device and that has a capacity to support beamforming for the second relay wireless device.

12. The system of claim 10, wherein the downlink signal indicator and uplink signal indicator comprise a received signal level of the downlink signal and the uplink signal, respectively.

13. The system of claim 10, wherein the downlink signal indicator and uplink signal indicator comprise a signal to noise ratio of the downlink signal and the uplink signal, respectively.

14. The system of claim 11, wherein determining that the first beamform-capable access node has reached the beamform limit is based on a number of antennae of the first beamform-capable access node being utilized to transmit the beamformed signal to the first relay wireless device.

15. A processing node for selecting a relay wireless device for beamforming activation, the processing node being configured to perform operations comprising:
    determining first and second beamform-capable access nodes located within a radio range of a plurality of wireless devices, the plurality of wireless devices comprising one or more relay wireless devices and one or more end-user wireless devices, wherein a first relay wireless device is attached to the first beamform-capable access node and a first end-user wireless device is directly attached to the first beamform-capable access node without going through a relay wireless device;

determining that the first end-user wireless device meets a beamforming criteria and that the first relay wireless device does not meet the beamforming criteria; and regardless of the first end-user wireless device meeting the beamforming criteria and the first relay wireless device not meeting the beamforming criteria, instructing the first beamform-capable access node to utilize beamforming for the first relay wireless device and to not utilize beamforming for the first end-user wireless device.

16. The processing node of claim 15, wherein the operations further comprise:

determining that the first beamform-capable access node has reached a beamform limit; and performing a handover of at least one of the plurality of wireless devices to the second beamform-capable access node, the second beamform-capable access node having a capacity to support beamforming.

17. The processing node of claim 15, wherein the plurality of wireless devices comprises more than one relay wireless device, and the operations further comprise:

ranking the relay wireless devices meeting the beamforming criteria based on a number of end-user wireless devices connected to each relay wireless device, wherein the relay wireless device with the greatest number of end-users connected thereto is given the highest priority and the relay wireless device with the lowest number of end-users connected thereto is given the lowest priority;

performing the handover of the relay wireless device receiving a beamformed signal from the first beamform-capable access node having the lowest priority to the second beamform-capable access node; and instructing the first beamform-capable access node to transmit a beamformed signal to the relay wireless device having the highest priority.

18. The processing node of claim 16, wherein performing the handover comprises handing over an end-user wireless device to the second beamform-capable access node.

* * * * *